United States Patent
Han et al.

(10) Patent No.: US 10,810,430 B2
(45) Date of Patent: Oct. 20, 2020

(54) AUGMENTED REALITY WITH MARKERLESS, CONTEXT-AWARE OBJECT TRACKING

(71) Applicant: AT&T Intellectual Property I, L.P., Atlanta, GA (US)

(72) Inventors: Bo Han, Bridgewater, NJ (US); Muhammad Bilal Anwer, Branchburg, NJ (US); Vijay Gopalakrishnan, Edison, NJ (US); Wenxiao Zhang, Hong Kong (CN); Pan Hui, Hong Kong (CN)

(73) Assignees: AT&T INTELLECTUAL PROPERTY I, L.P., Atlanta, GA (US); THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 1 day.

(21) Appl. No.: 16/234,029

(22) Filed: Dec. 27, 2018

(65) Prior Publication Data

US 2020/0210704 A1 Jul. 2, 2020

(51) Int. Cl.
*G06K 9/00* (2006.01)
*G06K 9/62* (2006.01)
(Continued)

(52) U.S. Cl.
CPC ....... *G06K 9/00671* (2013.01); *G06K 9/6215* (2013.01); *G06K 9/6247* (2013.01);
(Continued)

(58) Field of Classification Search
CPC ............. G06K 9/00671; G06K 9/6215; G06K 9/6247; G06T 7/246; G06T 7/73; G06T 7/13; G06T 3/40
See application file for complete search history.

(56) References Cited

U.S. PATENT DOCUMENTS 7,889,193 B2  2/2011  Platonov et al.
8,782,077 B1*  7/2014  Rowley ............... G06F 16/5838
                                                           707/769

(Continued)

FOREIGN PATENT DOCUMENTS

CN    106875478 A    6/2017
WO    2011149159 A1  12/2011
WO    2017210822 A1  12/2017

OTHER PUBLICATIONS

Vacchetti, L. & Lepetit, V. & Fua, P. (2004). Combining edge and texture information for real-time accurate 3D camera tracking. ISMAR 2004: Proceedings of the Third IEEE and ACM International Symposium on Mixed and Augmented Reality. 48-56. doi:10. 1109/ISMAR.2004.24. https://www.researchgate.net/publication/4118059_Combining_Edge_and_Texture_Information_for_Real-Time_Accurate_3D_Camera_Tracking.

(Continued)

*Primary Examiner* — Haixia Du (57) ABSTRACT

A processing system having at least one processor may obtain a feature set from a camera frame of a client device, perform a feature reduction of the feature set to produce a reduced feature set, generate a compressed representation from the reduced feature set, compare the compressed representation of the reduced feature set to a plurality of compressed representations of known objects stored in one or more hash tables to identify an object in the camera frame, and provide an identification of the object to the client device.

20 Claims, 6 Drawing Sheets

(51) Int. Cl.
*G06T 7/13* (2017.01)
*G06T 3/40* (2006.01)
*G06T 7/73* (2017.01)
*G06T 7/246* (2017.01)

(52) U.S. Cl.
CPC .............. *G06T 3/40* (2013.01); *G06T 7/13* (2017.01); *G06T 7/246* (2017.01); *G06T 7/73* (2017.01)

(56) References Cited

U.S. PATENT DOCUMENTS

| | | | |
|---|---|---|---|
| 8,791,960 | B2 | 7/2014 | Yoon et al. |
| 8,810,598 | B2 | 8/2014 | Soon-Shiong |
| 8,890,896 | B1 | 11/2014 | Tseng |
| 8,913,792 | B2 | 12/2014 | BenHimane et al. |
| 9,256,806 | B2 | 2/2016 | Aller et al. |
| 9,349,191 | B2 | 5/2016 | Cho et al. |
| 9,613,462 | B2 | 4/2017 | Mullins |
| 9,633,447 | B2 | 4/2017 | Swaminathan et al. |
| 9,659,380 | B1 | 5/2017 | Castellani et al. |
| 9,761,059 | B2 | 9/2017 | Nistel et al. |
| 9,904,850 | B2 | 2/2018 | Wnuk et al. |
| 9,911,231 | B2 | 3/2018 | Subramanian et al. |
| 9,928,656 | B2 | 3/2018 | Jiang et al. |
| 9,990,759 | B2 | 6/2018 | Mullins |
| 10,055,894 | B2 | 8/2018 | Chowdhary et al. |
| 2003/0012410 | A1 | 1/2003 | Navab et al. |
| 2010/0257252 | A1 | 10/2010 | Dougherty et al. |
| 2012/0106847 | A1* | 5/2012 | Qi .................. G06K 9/4671 382/195 |
| 2012/0306850 | A1 | 12/2012 | Balan et al. |
| 2014/0226853 | A1* | 8/2014 | Chang ............... G06K 9/00362 382/103 |
| 2014/0376804 | A1* | 12/2014 | Akata ................ G06K 9/4676 382/159 |
| 2015/0070347 | A1 | 3/2015 | Hofmann et al. |
| 2016/0155011 | A1* | 6/2016 | Sulc .................. G06T 7/73 382/103 |
| 2016/0350622 | A1 | 12/2016 | Sugaya |
| 2017/0076168 | A1* | 3/2017 | Vrabete ............... G06F 16/51 |
| 2017/0293611 | A1* | 10/2017 | Tu ...................... G06F 16/438 |
| 2018/0114364 | A1 | 4/2018 | McPhee et al. |
| 2018/0261012 | A1 | 9/2018 | Mullins et al. |
| 2018/0330544 | A1 | 11/2018 | Corso et al. |
| 2018/0365853 | A1* | 12/2018 | Yang .................. G06T 7/75 |
| 2019/0392084 | A1* | 12/2019 | Joyce ................. G06F 16/532 |

OTHER PUBLICATIONS

Papagiannakis, G. & Singh, G. & Magnenat-Thalmann, N. (2008), A survey of mobile and wireless technologies for augmented reality systems. Comp. Anim. Virtual Worlds, 19: 3-22. doi:10.1002/cav.221. https://calhoun.nps.edu/bitstream/handle/10945/41253/Singh_d912f5075af50e0812_2008.pdf;sessionid=7AADB16A1D46AE5B2597A372DF9FCC12?sequence=1.

Oh, S. & Woo, W. (2009). CAMAR: Context-aware mobile Augmented Reality in smart space. Proceedings of IWUVR 2009. 48-51. https://pdfs.semanticscholar.org/da46/dab2a30dad94a27ffe77068c0ea9efd4c250.pdf.

van Krevelen, D.W.F. & Poelman, R. (2010). A survey of augmented reality technologies, applications and limitations. Int. J. Virtual Reality. 9: 1-21. https://www.researchgate.net/profile/Rick_Van_Krevelen2/publication/279867852_A_Survey_of_Augmented_Reality_Technologies_Applications_and_Limitations/links/58dab7f445851578dfcac285/A-Survey-of-Augmented-Reality-Technologies-Applications-and-Limitations.pdf.

Karlekar, J. & Zhou, S. & Lu, W. & Zhi, C.L. & Nakayama, Y. & Hii, D. (2010). Positioning, tracking and mapping for outdoor augmentation. 175-184. doi: 10.1109/ISMAR.2010.5643567. https://www.computer.org/csdl/proceedings/ismar/2010/9343/00/05643567.pdf.

Rambach, J. & Pagani, A. & Schneider, M. & Artemenko, O. & Stricker, D. 6DoF object tracking based on 3D scans for Augmented Reality remote live support. Computers 2018. 7, 6. doi: 10.3390/computers7010006. https://www.mdpi.com/2073-431X/7/1/6.

* cited by examiner

AUGMENTED REALITY WITH MARKERLESS, CONTEXT-AWARE OBJECT TRACKING

The present disclosure relates generally to mobile device-based augmented reality platforms, and more particularly to methods, computer-readable media, and devices for identifying an object in a camera frame, and methods, computer-readable media, and devices for annotating a rendering of a camera view to include at least one annotation associated with an object that is identified in a camera frame.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, computer-readable medium, and device for identifying an object in a camera frame. For instance, a method may include a processing system having at least one processor obtain a feature set from a camera frame of a client device, performing a feature reduction of the feature set to produce a reduced feature set, generating a compressed representation from the reduced feature set, comparing the compressed representation of the reduced feature set to a plurality of compressed representations of known objects stored in one or more hash tables to identify an object in the camera frame, and providing an identification of the object to the client device.

In another example, the present disclosure describes a method, computer-readable medium, and device for annotating a rendering of a camera view to include at least one annotation associated with an object that is identified in a camera frame. For instance, a method may include a processing system having at least one processor extracting a camera frame from a camera view of the processing system, transmitting an object recognition request to a server, the object recognition request including the camera frame, obtaining, from the server, an identification of an object in the camera frame, where the identification includes an object boundary of the object in the camera frame, and annotating a rendering of the camera view to include at least one annotation associated with the object that is identified, where the at least one annotation is in accordance with the object boundary of the object in the camera frame.

The present disclosure provides a mobile Augmented Reality (AR) system that features accurate, low-latency, and large-scale object recognition with flexible, robust, and context-aware tracking. In particular, the present disclosure pushes the limit of mobile AR end-to-end latency by leveraging hardware acceleration with graphics processing units (GPUs), e.g., in an edge/cloud deployment. In addition, in one example, marker-less object tracking offered by AR development tools (such as ARCore and ARKit) is seamlessly integrated into the present systems. The marker-less object tracking may be achieved by tracking visual features captured via a device camera in conjunction with movement data from an inertial measurement unit (IMU) of the device. In one example, the system architecture of the present disclosure has two parts: a low-latency image retrieval pipeline with GPU acceleration on edge cloud servers, and a lightweight client application that enriches the client AR platform with object recognition. Examples of the present disclosure may achieve an end-to-end latency as low as ~33 ms, which may significantly improve the quality of user experience for mobile AR applications. These and other aspects of the present disclosure are described in greater detail below in connection with the examples of FIGS. 1-6.

Figure 1:
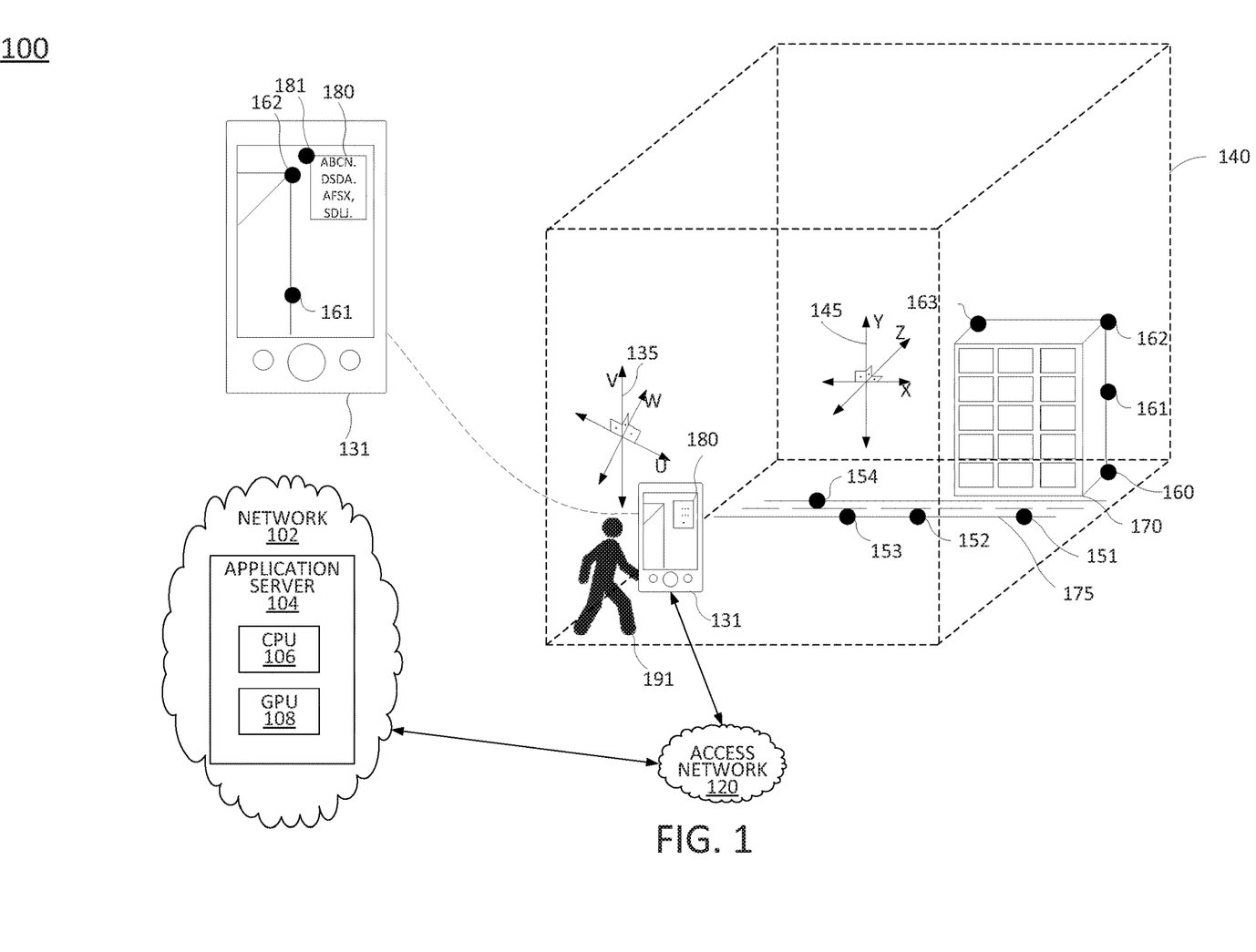
FIG. 1 illustrates an example network related to the present disclosure.

To aid in understanding the present disclosure, FIG. 1 illustrates an example system 100 in which examples of the present disclosure for identifying an object in a camera frame and for annotating a rendering of a camera view to include at least one annotation associated with an object that is identified in a camera frame may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises. The network 102 may be in communication with one or more access network 120 and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an Internet Protocol Television (IPTV) network, as well as an Internet Service Provider (ISP)

network. In one example, network 102 may include a plurality of television (TV) servers (e.g., a broadcast server, a cable head-end), a plurality of content servers, an advertising server (AS), an interactive TV/video on demand (VoD) server, and so forth.

Figure 3:
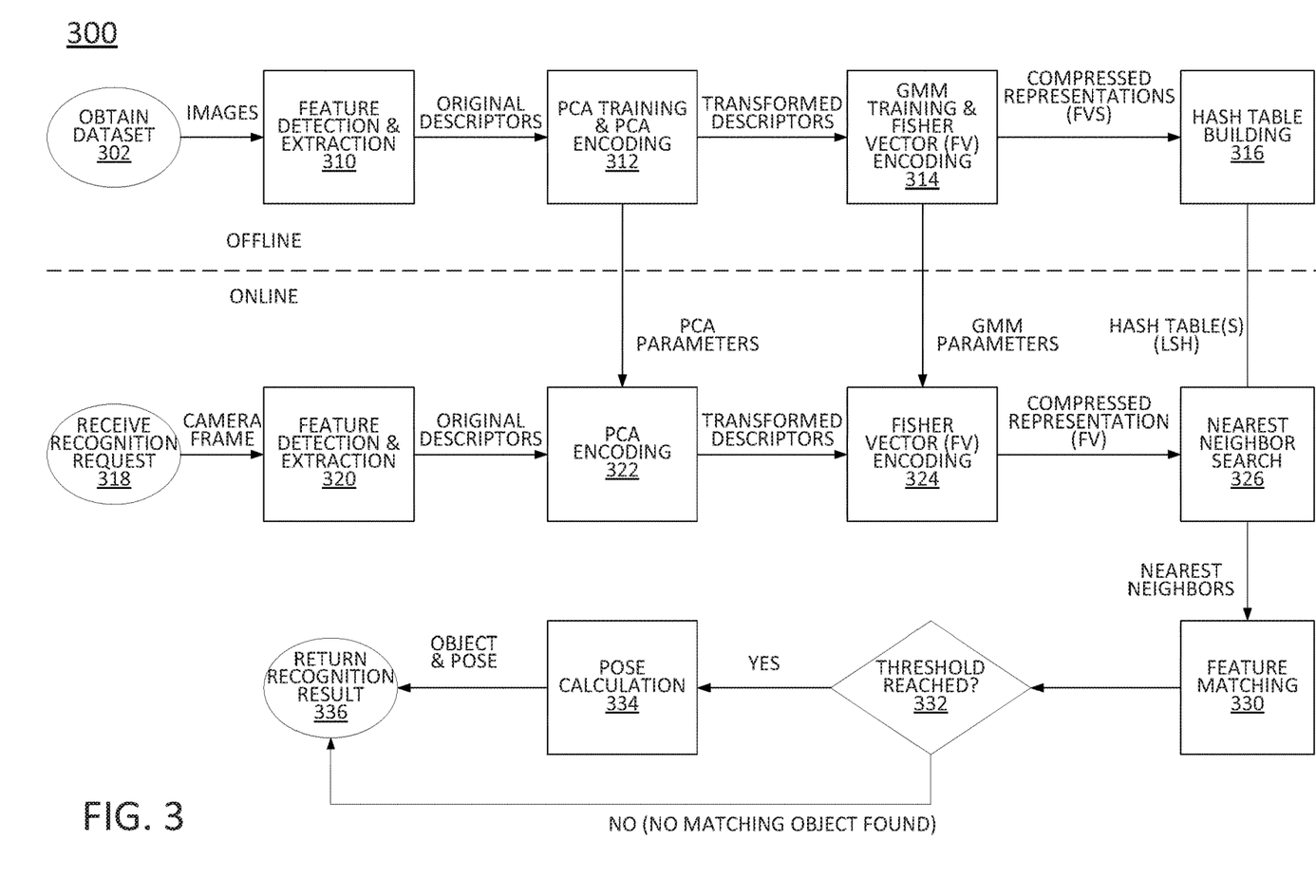
FIG. 3 illustrates an example of an object recognition pipeline, including offline and online portions.
Figure 6:
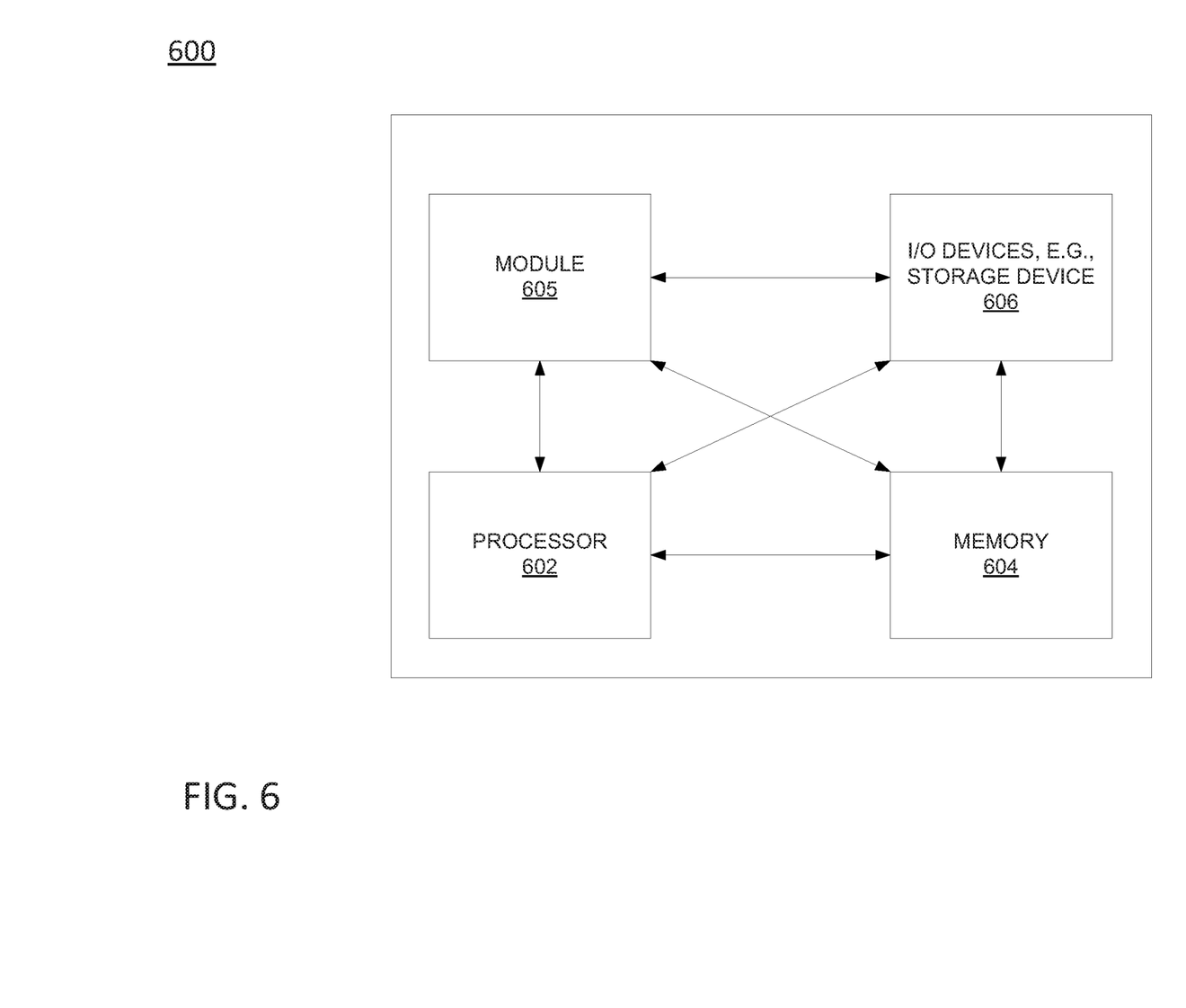
FIG. 6 illustrates a high level block diagram of a computing device specifically programmed to perform the steps, functions, blocks and/or operations described herein.

In accordance with the present disclosure, application server (AS) 104 may comprise a computing system or server, such as computing system 600 depicted in FIG. 6, and may be configured to provide one or more operations or functions for identifying an object in a camera frame, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for identifying an object in a camera frame, in accordance with the present disclosure. In one example, AS 104 may comprise a physical storage device (e.g., a database server), to store various types of information in support of systems for identifying an object in a camera frame, in accordance with the present disclosure. For example, AS 104 may store data regarding various images/objects, such as one or more hash tables of compressed representations of known objects, raw image/object information (e.g., pictures in Joint Photographic Experts Group (JPEG), or other formats), downscaled images of objects, features sets derived from images of objects, annotation information for various objects, and so forth that may be processed by AS 104 in connection with identifying an object in a camera frame.

As further illustrated in FIG. 1, application server 104 includes at least one CPU 106 and at least one GPU 108. In accordance with the present disclosure, various steps, functions, and/or operations for identifying an object in a camera frame as described herein may be distributed among GPU(s) and CPU(s). In one example, application server 104 may comprise edge computing infrastructure of network 102. In other words, application server 104 may comprise one of several similar computing systems distributed at or near locations where the network 102 connects to customer devices. In one example, application server 104 may comprise network function virtualization infrastructure (NFVI), e.g., one or more devices or servers that are available as host devices to host virtual machines comprising virtual network functions (VNFs). In other words, at least a portion of the network 102 may incorporate software-defined network (SDN) components. For ease of illustration, various additional elements of network 102 are omitted from FIG. 1.

In one example, the access network 120 may comprise a broadband optical and/or cable access network, a Local Area Network (LAN), a wireless access network (e.g., an IEEE 802.11/Wi-Fi network and the like), a cellular access network, a Digital Subscriber Line (DSL) network, a public switched telephone network (PSTN) access network, a $3^{rd}$ party network, and the like. For example, the operator of network 102 may provide a cable television service, an IPTV service, or any other types of telecommunication service to subscribers via access network 120. In one example, the network 102 may be operated by a telecommunication network service provider. The network 102 and the access network 120 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a device 131. Access network 120 may transmit and receive communications between device 131 and application server (AS) 104, other components of network 102, devices reachable via the Internet in general, and so forth. In one example, device 131 may comprise a mobile device, a cellular smart phone, a wearable computing device (e.g., smart glasses) a laptop, a tablet computer, a desktop computer, an application server, a bank or cluster of such devices, and the like. In one example, device 131 comprises a computing system or device, such as computing system 600 depicted in FIG. 6, and may be configured to provide one or more operations or functions for annotating a rendering of a camera view to include at least one annotation associated with an object that is identified in a camera frame, as described herein.

In one example, the device 131 is associated with a user 191 at a physical environment 140. As illustrated in FIG. 1, the device 131 may comprise a smartphone with a camera to capture camera frames, e.g., comprising sequences of still images and/or video (e.g., 2D images) from the physical environment 140. For illustrative purposes, the physical environment 140 may include a building 170 and a road 175.

In accordance with the present disclosure, device 131 may include an augmented reality (AR) platform/component capable of tracking objects in an environment, tracking changes in a camera view/perspective with respect to the environment, rendering AR annotations/overlays via a display component of the device 131, and so forth. For instance, device 131 may be configured with a markerless AR object tracking platform such as ARCore, ARKit, or the like. It should be noted that markerless object tracking may include identifying feature points in an environment and then tracking the movement of the feature points over time in conjunction with measurements from inertial sensors of an AR device in order to render AR annotations and to maintain consistency between the annotations and the environment as the environment and or the camera view changes. To illustrate, in the present example, device 131 (e.g., via an AR platform operating thereon) may identify feature points 151-154 of road 175 and feature points 160-163 of building 170. For example, an AR platform may detect features points on edges, corners, or other distinctive features in the environment. This may be in contrast to (non-markerless) AR systems which utilize physically tagged objects, such as RFID tagged objects, objects with barcodes, quick response (QR) codes, or the like to provide streamlined object recognition.

In one example, the device 131 may track the "pose" of device 131, e.g., the position and orientation of the device 131 and/or a camera thereof. For instance, the AR platform may maintain a "world space" for each camera frame which may map feature points to points in the world space. In one example, a given point in the physical environment 140, e.g., one of the feature points, may be selected as a reference point (e.g., an origin for coordinates of the world space). The pose of the device 131/camera may then be specified as a rotation and translation from the reference point and a reference axis. For instance, the world space may be defined with respect to a frame of reference 145 (e.g., axis X, Y, and Z, having a reference point at the origin at the intersection of X, Y, and Z). The pose of the device 131/camera may then be specified as a rotation with respect to one or more of the axis X, Y, and Z, and a translation from the frame of reference 145. For instance, the local frame of reference of device 131/camera is illustrated at 135. The axis U, V, and W may be defined by one or more rotations from the axis X, Y, and Z. In addition, the position of the origin at the intersection of U, V, and W may be specified as a vector/positional translation from the point at the intersection/origin of X, Y, and Z. It should again be noted that the pose of device 131 may be recomputed from one camera frame to another by tracking the positional changes of features points (e.g., 151-154, 160-163, etc.) as well as by utilizing inertial measurements of an inertial measurement unit (IMU) of device 131.

Although the AR platform of device 131 may provide markerless tracking, it may lack contextual awareness. For instance, building 170 may comprise a well-known landmark. However, the AR platform may have no understanding of this fact. In addition, the AR platform may lack awareness that the feature points 160-163 even correspond to a building. Examples of the present disclosure may provide object recognition (contextual awareness) through edge and/or cloud computing resources which enhance the capabilities of endpoint device based AR platforms, such as that of device 131.

To illustrate, device 131 may communicate via access network 120 with AS 104. In the present example, the device 131 may capture 2D camera frames that include images of a building 170, road 175, etc. In one example, device 131 may extract features from the camera frame, such as features points, low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, patterns of feature points (e.g., patterns corresponding to edges, corners, curves, and other salient features of an object), and so forth. In one example, device 131 may provide a sparse point cloud (e.g., of feature points) and/or a reduced-size version of the camera frame to AS 104.

In accordance with the present disclosure application server 104 may obtain a feature set from a camera frame (e.g., from device 131). The feature set may be provided by device 131, or application server 104 may extract the features from the camera frame/image, a reduced size version of the camera frame/image, etc. Application server 104 may then perform a feature reduction of the feature set to produce a reduced feature set, generate a compressed representation from the reduced feature set, compare the compressed representation of the reduced feature set to a plurality of compressed representations of known objects stored in one or more hash tables to identify an object in the camera frame, and provide an identification of the object to the device 131. The identification of the object may include a descriptor/identity of the object, and may further include a vector of feature points which define the object (e.g., a 2D outline of the object).

In one example, application server 104 may also determine a size of the object and may further provide the size information to device 131. In addition, in one example, application server 104 may store annotation information for various known objects, and may provide the annotation information in connection with the object that is detected. To illustrate, application server 104 may identify that an object in the camera frame is the building 170 (e.g., a landmark building), and may provide annotation information, such as a short text paragraph describing the history of the building, to the device 131. As described in greater detail below, these different functions may be distributed among CPU 106 and GPU 108, respectively.

Device 131, upon receiving, the identification of the object from application server 104 may then render the annotation via a display. For instance, as illustrated in FIG. 1 the device 131 may render the text box 180 in relation to the building 170 in a display screen of the device 131. For example, the display screen may display the camera frame from a camera of device 131, along with any additional AR information, such as the text box 180. In addition, device 131 may establish a size of the text box 180 from the size information of building 170 which may be provided by application server 104. For instance, application server 104 may provide the annotation information (text box 180) to device 131 along with information for establishing the size of the text box in relation to the size of the building 170.

In one example, the device 131 may utilize the outline/feature points identified for the building 170 to "anchor" the annotation/text box 180 to a particular location in the AR world space. For example, text box 180 may comprise an anchor point 181, the position of which can be placed at a fixed location within the world space by specifying in relation to several feature points. For instance, anchor point 181 may be placed by specifying an offset with respect to feature point 161, feature point 162, etc. Thus, even as the pose of device 131 may change for another camera frame, the text box 180 may be rendered by the AR platform of device 131 via the display with a fixed, or relatively fixed 3D positional relationship to the building 170.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access network 120, and/or Internet may comprise a content distribution network (CDN) having ingest servers, edge servers, and the like for packet-based streaming of video, audio, or other content. Similarly, although only a single access network 120 is shown, in other examples, access network 120 may comprise a plurality of different access networks, of a same access network type or of different access network types, which may interface with network 102 independently or in a chained manner. In one example, the system 100 may further include wireless or wired connections to sensors, radio frequency identification (RFID) tags, or the like from which devices may determine locations/positions, ranges/ distances, bearings, and so forth within the physical environment 140. For instance, in one example, wireless beacons (not shown) in physical environment 140 having known locations may be used as reference points to supplement the rendering of a "world space" via feature point tracking and inertial measurements, such as Institute of Electrical and Electronics Engineers (IEEE) 802.15 based-beacons, IEEE 802.11 wireless routers and/or access points (AP), cellular base stations (or more particularly, the base station antennas), etc. For instance, device 131 may determine its position via an observed time difference of arrival (OTDA), barycentric triangulation, or a similar technique with reference to one or more wireless beacons. Thus, these and other modifications are all contemplated within the scope of the present disclosure.

The present disclosure seeks to achieve an end-to-end latency close to the inter-frame interval for continuous object recognition (e.g., without requiring a user to pause the camera at an object of interest for seconds). The present disclosure achieves this goal in part through offloading computer vision tasks to GPU resources in the edge cloud. In one example, a precise runtime object size determination capability, as well as flexible and scalable object recognition capability is integrated with a marker-less object tracking AR platform.

An example mobile AR system may include seven primary functions, or stages. For instance, a mobile AR system may include a frame preprocessing stage (1) that shrinks the size of a camera frame, e.g., by downscaling it from a higher resolution to a lower one. In one example, the next stage is an object detection stage (2) that checks the existence of targets in the camera view of a mobile device and identifies the regions of interest (ROI) for the targets. The next stage may be a feature extraction stage (3) to extract feature points from each ROI. Following feature extraction may be an object recognition stage (4) to determine the original image stored in a database of to-be-recognized objects. Thereafter, a template matching stage (5) may verify the object-recognition result by comparing the target object with the recognized original image. The AR system may also calculate the pose of a target (e.g., position and orientation). In one example, an object tracking stage (6) takes the above target pose as its initial input and tracks a target object between frames in order to avoid object recognition for every frame. Finally, an annotation rendering stage (7) may augment the recognized object by rendering associated content (e.g., visual features to overlay on a display of a camera frame).

In accordance with the present disclosure, various stages of this pipeline may be performed via edge cloud computing resources, in particular via one or more GPUs. For instance, in one example, an AR client device (e.g., a mobile device, such as device 131 of FIG. 1), may upload camera frames/ images to an edge cloud server and/or processing system (e.g., application server 104) broadly, a "network-based processing system." The network-based processing system may then perform feature extraction, object recognition, etc. In another example, an AR client device may perform feature extraction locally and send the compressed feature points to the network-based processing system for object recognition. It should be noted that since special hardware (e.g., GPU) is used in the network-based processing system, e.g., at least to perform certain tasks, the network-based processing system is not simply running the same code as may have previously been run at the AR client without edge cloud offloading.

Where users can freely move their mobile devices in connection with an AR experience, continuous and accurate object recognition may be challenging. For example, the AR system may have to track the updated pose of a target object within each frame to render annotation content(s) properly. For non-continuous object recognition, a user may need to pause the camera of a mobile device at the interested object before an object recognition result is returned, either locally or from the cloud. For marker-based AR which relies on the recognition of images or trackers (e.g., QR codes) and pre-knowledge of the environment (e.g., a database of to-be-recognized objects), object tracking may be achieved though technologies such as optical flow tracking of recognized object.

With the emergence of precise sensors and high quality cameras on mobile devices, marker-less AR platforms are available which allow users to lay annotations over imagery of the physical world without object recognition. Markerless AR (also referred to as "dead reckoning") may solve the simultaneous localization and mapping (SLAM) problem in run-time. Example systems include ARCore from Google, ARKit from Apple, Instant Tracking from Wikitude, and Smart Terrain from Vuforia. Both ARCore and ARKit employ image frames from the monocular camera and motion data from the inertial measurement unit (IMU) to track the position and orientation of a mobile device in a 3D space. Accordingly, the object tracking capability may be more robust than those that only track planar objects. For example, ARCore utilizes concurrent odometry and mapping to understand the pose of a mobile device relative to the real world, by combining feature points from captured camera images and inertial measurements from an IMU.

Figure 2:
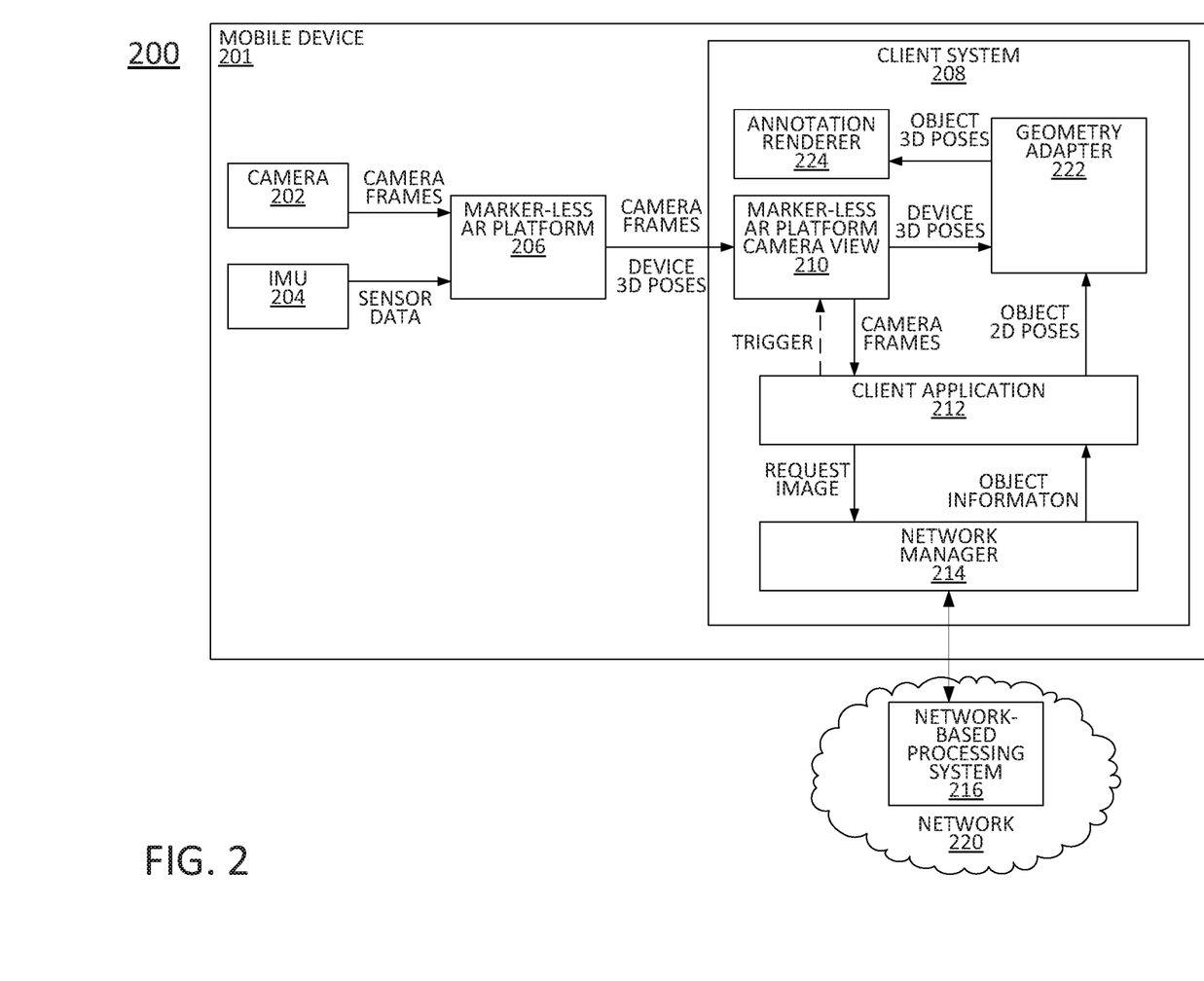
FIG. 2 illustrates an example system of the present disclosure.

FIG. 2 illustrates an example system 200 of the present disclosure. As shown in FIG. 2, the system 200 includes a mobile device 201 (e.g., a "client device") and a network-based processing system 216 deployed in network 220. The mobile device 201 may comprise an AR device, such as AR glasses, a mobile device, e.g., a smartphone, and so forth. The network-based processing system 216 may comprise, for example, public cloud or network-service provider and/ or edge cloud computing resources. This may include one or more dedicated servers and/or one or more NFVI/host devices hosting one or more VMs, containers, or the like for providing various functions for identifying an object in a camera frame, as described herein.

Although various marker-less AR platforms may provide object tracking, these platforms may lack context-awareness. Objects may be tracked since the objects may have distinctive features, but there is no understanding of what those objects are, the specific object boundaries, etc. In one example, the present disclosure may supplement a markerless AR platform to provide object recognition. In addition, the present disclosure may also provide enhanced motion tracking by determining a recognized object's pose for each frame. Referring now the example of FIG. 2, it may be assumed that a marker-less AR platform 206, such as ARCore, may control the camera hardware (camera 202) of device 201 and render a camera view 210 (e.g., using OpenGL). In one example, the view of annotation renderer 224 of a client system 208 of the present disclosure is overlaid on top of the camera view 210 from the marker-less AR platform 206. In one example, a client application 212 triggers an object recognition request and may extract the current camera frame from the marker-less AR platform camera view 210. The client application may then send the recognition request containing that frame to one or more edge cloud servers (broadly, a network-based processing system 216) via a network manager 214.

The network-based processing system 216 may return a result which may include a recognized object's boundary (vertices locations) within the image/camera frame, the object's size in pixels, and other information such as an object identifier, name, etc.

To render annotation contents, the client application 212 may transform the recognized object's 2D boundary into a 3D pose in six degrees of freedom (6 DoF) via a geometry adapter 222. To illustrate, the conversion of a 3D vertex coordinate v3D (x, y, z) into a 2D screen coordinate v2D (m, n) may be accomplished through matrix transformations (e.g., per OpenGL):

$$v2D = P*V*M*v3D \qquad \text{Equation 1.}$$

In Equation 1, M is the model matrix describing the object placement in 3D, V is the view matrix describing the camera placement in 3D, and P is the projection matrix describing the 3D to 2D clip and projection transformation. In the present example, P and V may be provided by the marker-less AR platform 206 for each frame. v2D (the locations of the recognized object's vertices in the 2D camera view) and v3D (derived from the object size in pixels) are returned from the network-based processing system 216. However, with the four known values, it may still not be possible to derive M from the above Equation 1. For instance, an object moving away from the camera 202 but growing in size at the same time. The object may therefore appear unchanged in the camera view. That is, for each v2D, there are multiple possibilities of M corresponding to it, because the information on the object's physical size is still missing.

To determine the physical size of an object at runtime, the present disclosure may utilize both the mapping information from the marker-less AR platform 206 and the recognition result from the network-based processing system 216. The former models the environment in physical scale and the latter determines the boundary and location of the object within the environment. In one example, the marker-less AR platform 206 may generate a sparse 3D point cloud of the environment as part of the marker-less AR platform's SLAM functionality, which describes each point's location in the physical world scale. In one example, some points in the point cloud may be fitted into a plane based on their 3D locations. For example, in OpenGL, the camera imaging plane (camera view) is placed between the camera and the object(s), and the 3D points within a truncated pyramid frustum in front of the camera are projected onto the imaging plane. Using a ray cast from the camera in the direction of an object's 2D vertex within the camera view, the first plane in the point cloud hit by the ray is the object plane, and the intersection point is exactly the 3D location of the corresponding physical object vertex. Based on these vertices, the present client application 212 may derive the physical size and the model matrix M of the object. This enables the annotation renderer 224 to place the annotation contents precisely aligned with the object. The marker-less AR platform 206 may continue to track the recognized object as well as the rendered annotation(s) via feature points from the camera frames as well as from sensor data from inertial measurement unit (IMU) 204. In one example, the present disclosure may calculate the physical size of planar objects (e.g., building facades, movie posters, billboards, paintings, etc.). Calculating the physical size of non-planar 3D objects may be more challenging. However, with the physical size and pose given as an input, the present disclosure may track any rigid object.

FIG. 3 illustrates an example object recognition pipeline 300 with GPU acceleration on edge cloud servers. As mentioned above, the present disclosure seeks to provide an end-to-end latency lower than the camera frame interval, which may be approximately 33 ms (30 frames per second) to achieve what may be considered a higher quality of user experience. The example object recognition pipeline 300 may achieve this level of performance, as described in greater detail below.

As illustrated in FIG. 3, the server-side (network-based processing system) functions of the present disclosure may be segregated into two parts, offline preparation and online recognition. In one example, the offline processing may include four stages as shown in FIG. 3: (1) feature detection and extraction (stage 310), (2) principal component analysis (PCA) training and encoding (stage 312), (3) Gaussian mixture model (GMM) and Fisher vector encoding (stage 314), and (4) hash table building (e.g., one or more locality sensitive hash (LSH) tables) (stage 316). In particular, the network-based processing system may first obtain a dataset of objects/images (302) extract feature points from the reference images (stage 310), reduce the dimensionality of such features (stage 312), train a statistical model to compress the reduced feature sets into a compressed representations (stage 314), and generate hash table(s) of compressed representations for faster object recognition (stage 316).

In one example, the result of the feature detection and extraction (stage 310) may be a set of feature descriptors. In one example, a scale invariant feature transform (SIFT) process may be used. For instance, each feature point extracted by SIFT includes 128 dimensions, some of which may be correlated. For a given image, the feature detection and extraction stage may output up to 1000 or more feature points. In other, further, and different examples, another feature detection and extraction algorithm may be used, such as a speeded up robust features (SURF) process, a features from accelerated segment test (FAST) process, a fast retina keypoint (FREAK) process, a binary robust invariant scalable keypoints (BRISK) process, or the like.

In one example, the dimensionality reduction (stage 312) may apply principal component analysis (PCA) to decrease the dimension of feature descriptors, e.g., to less than 100. For instance, in one example, the result of the PCA may be 82 features/dimensions. PCA is a statistical procedure that transforms possibly correlated variables into linearly uncorrelated ones. Before the transformation, feature descriptors from all reference images may be used to train the PCA parameters. However, in another example, images which are not necessarily associated with an object to be recognized or which may not be stored in the final resulting hash table(s) may still be used to train the PCA parameters.

Next, the feature encoding (stage 314) may create a more compact representation with the same size for each image. For example, since the number of feature points may ranges from 500 to 1,000 for different images/objects a more compact representation may streamline the online object recognition. In one example, the feature encoding stage builds a statistical model (e.g., Gaussian mixture model (GMM)) using the feature points transformed by PCA, and then utilizes Fisher vector (FV) encoding to further compress the reduced feature set into compressed representations, e.g., Fisher vectors with a fixed length, one for each image.

Lastly, to further accelerate the online search the hash table building (stage 316) may store the compressed representations (e.g., Fisher vectors) in a hash table. In one example, the present disclosure maintains one or more locality sensitive hashing (LSH) tables and inserts FVs of the reference images into the LSH hash table(s) (e.g., using nearest neighbor calculations to place similar FVs (of similar objects/images) into buckets). Without hash tables, it may be necessary to calculate one-to-one distances (e.g., L2 distances) for the FV of a target object and that of each reference image, which may not be scalable for a large dataset.

Referring now to the lower portion of FIG. 3, the online recognition stages follows a similar pipeline to the stages of offline preparation above. For instance, upon receiving an object recognition request (stage 318) (e.g., along with a camera frame/image from a client device, or a reduced size version of the camera frame/image), the network-based processing system may first extract the feature points of the image (stage 320) (e.g., via SIFT, or the like), reduce the feature dimensionality using PCA with the offline trained parameters (stage 322), and create a single compressed representation of the reduced set of features (stage 324) (e.g., a Fisher vector of the image using the trained GMM model).

To find an object match to the image in the dataset, the network-based processing system may utilize the hash table(s), e.g., LSH table(s), created in the offline preparation stage to search for the top K nearest neighbors (stage 326), which are considered as recognition candidates. In one example, for each candidate, the network-based processing system may then perform a feature matching (stage 330) with the target object in the requested image/camera frame to verify the object recognition result. In one example, it is assumed that only a true match between an object in the camera frame and a known object should have a number of matched feature descriptors larger than a certain threshold. If no candidate reaches the threshold (stage 332), there may be no object recognition result contained in a response to the object recognition request from the client device. Otherwise, the network-based processing system may calculate the pose of the target object within the camera frame (stage 334), such as the object's boundary (vertices locations) and return to the client device the recognized object's boundary (vertices locations) within the image/camera frame, the object's size in pixels, and other information such as an object identifier, name, etc. (stage 336). It should be noted that in one example, only the nearest neighbor search 326 may be performed via CPU resources, while other online stages may be performed via GPU resources.

The latency of this example image retrieval pipeline 330 was tested for both public cloud and edge cloud scenarios to demonstrate performance consistent with the requirements of a high quality camera frame interval, e.g., 33 ms/30 fps. For instance, in the testing example, 10,000 images with a resolution of 375×500 were selected as the training dataset for the offline processing to train PCA and GMM parameters, generate Fisher vectors and insert Fisher vectors into LSH tables. 100 images were then randomly selected from the training dataset and photos of the images were captured via smartphone cameras. An edge cloud server comprising PC equipped with Intel I7-5820K CPU, 64 GB memory and a NVIDIA GTX 1080Ti GPU was utilized in one example test. The smartphone was connected to the edge cloud sever via a wireless hotspot over 802.11g at 2.4 GHz, with 16 Mbps uplink throughput and an approximately 4 ms round trip time (RTT). For a public cloud test, a VM on the Google Cloud Platform was instantiated with 4 vCPUs, 15 GB memory and a NVIDIA Tesla K80 GPU. The smartphone was connected to the Internet over 802.11g 2.4 GHz, with 4.4 Mbps uplink throughput and an approximately 45 ms RTT to the VM.

Table 1 shows the end-to-end latency of three offloading scenarios, public cloud with and without GPU, and edge cloud with GPU. The central processing unit (CPU) version of server implementation follows the same pipeline with the GPU implementation. Table 1 illustrates that GPU acceleration reduces the server processing time from approximately 187 ms to less than 20 ms. In addition, the edge cloud in the testing scenario has a more powerful GPU (Nvidia GTX 1080 Ti vs. Tesla K80) which results in a shorter processing time than the public cloud (14.9 ms vs. 17.8 ms). Benefiting from the closeness of the edge cloud to mobile devices, the data transfer latency is also reduced to less than 10 ms. As a result, the present disclosure may achieve an end-to-end latency of approximately 33.0 ms. It should be noted that the second number in each cell of Table 1 below is the standard deviation.

TABLE 1

| Execution time (ms) | Cloud CPU | | Cloud GPU | | Edge GPU | |
|---|---|---|---|---|---|---|
| Client process | 9.27 | 1.88 | 9.27 | 1.88 | 9.27 | 1.88 |
| Server process | 187 | 83.9 | 17.8 | 0.84 | 14.9 | 2.41 |
| Data transfer | 70.5 | 22.9 | 70.5 | 22.9 | 8.88 | 3.29 |
| Overall latency | 267 | 84.6 | 97.6 | 23.3 | 33.0 | 3.79 |

In addition, in one test scenario the time consumed in each step of the end-to-end edge cloud system was measured using 100 object recognition requests from the client. The preprocessing (frame resizing, JPEG encoding) was measured to be approximately 6.59 ms, and the post-processing (physical size estimation, 2D to 3D transformation, renderer update) was found to take approximately 2.68 ms. The overall client-side processing latency is thus approximately 9.27 ms. On the server side, the total processing latency was measure at approximately 14.9 ms, with template matching for the nearest neighbor. It should be noted that the nearest neighbor searching may be performed on a CPU (while other stages are performed via GPU). The CPU-based nearest neighbor search was recorded at 4.51 ms on average for the dataset with 10,000 images. For K>1 nearest neighbors, the time taken by LSH searching does not increase, but the feature matching/template matching may be repeated up to K times. Nevertheless, the present retrieval pipeline was observed to achieve close to 100% accuracy with only one nearest neighbor (for images with 400×533 resolution). The size of request images (camera frames) may affect the recognition accuracy, but has minimal impact on the computational latency. This is a result of the fact that the test system implements at most 1,000 feature points (e.g., SIFT feature points) for each image regardless of size (which can already ensure a high recognition accuracy). With the help of ultra-low latency and high throughput 5G networks, the end-to-end latency of mobile AR may be further reduced.

Figure 4:
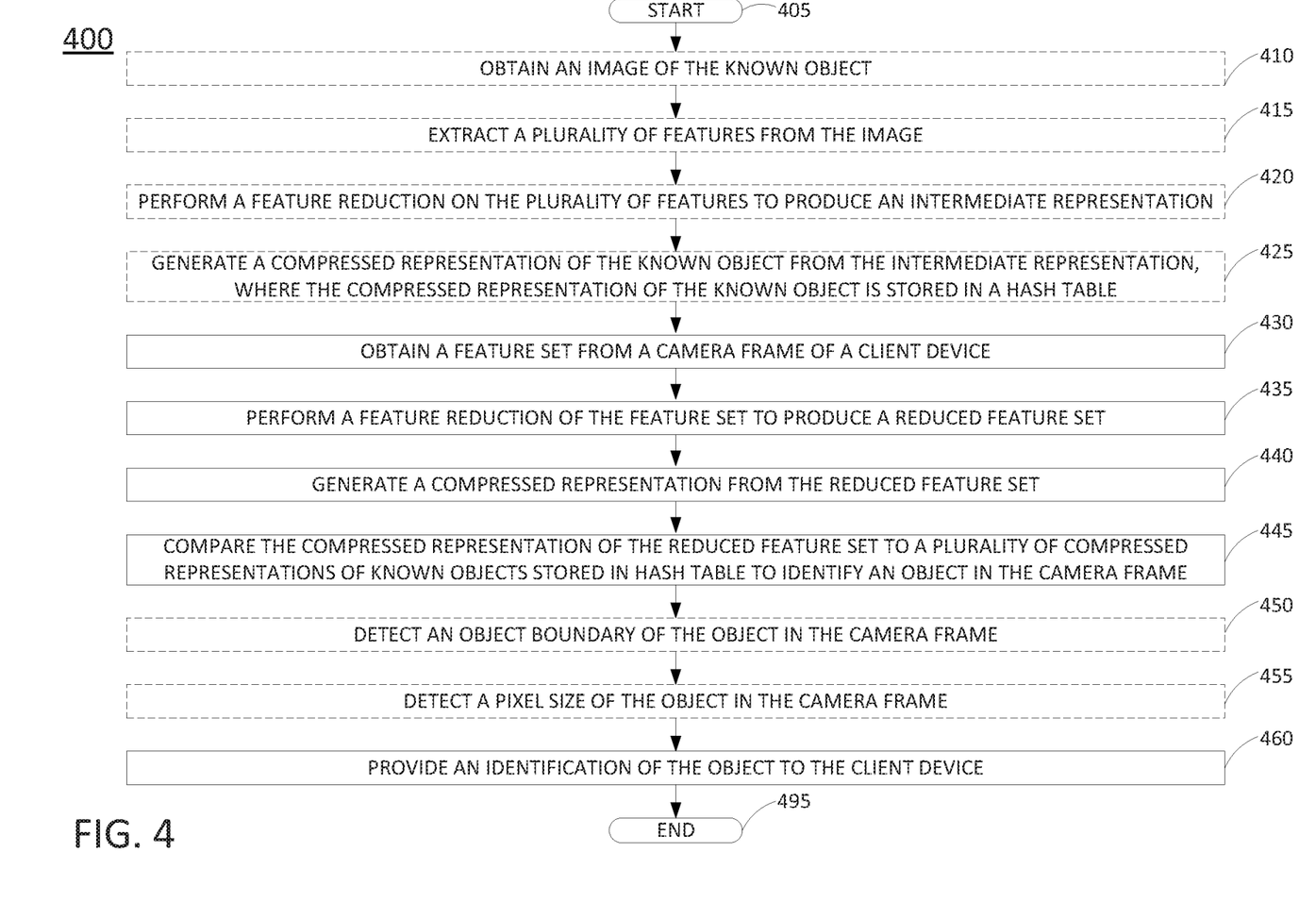
FIG. 4 illustrates a flowchart of an example method for identifying an object in a camera frame.

FIG. 4 illustrates a flowchart of an example method 400 for identifying an object in a camera frame, in accordance with the present disclosure. In one example, the method 400 is performed by a component of the system 100 of FIG. 1, such as by application server 104, and/or any one or more components thereof (e.g., a processor, or processors, performing operations stored in and loaded from a memory), or by application server 104, in conjunction with one or more other devices, such as device 131, and so forth. In one example, the steps, functions, or operations of method 400 may be performed by a computing device or system 600, and/or processor 602 as described in connection with FIG. 6 below. For instance, the computing device or system 600 may represent any one or more components of application server 104, device 131, etc. in FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 600 may collectively function as a processing system. For illustrative purposes, the method 400 is described in greater detail below in connection with an example performed by a processing system. The method 400 begins in step 405 and may proceed to optional step 410 or to step 430.

At optional step 410, the processing system may obtain an image of a known object. The image may come from any number of sources, such as a public image library/database, a plurality of cameras associated with a user of the client device, a service provider associated with the processing system, and so forth.

At optional step 415, the processing system may extract a plurality of features from the image (e.g., a "feature set"). In one example, optional step 415 may include a feature extraction in accordance with a SIFT process, a SURF process, a FAST process, a FREAK process, a BRISK process, or the like. In one example, optional step 415 may comprise the same or similar operations as described above in connection with stage 310 of the example pipeline 300 of FIG. 3.

At optional step 420, the processing system may perform a feature reduction on the plurality of features to produce an intermediate representation. In one example, optional step 420 may comprise the same or similar operations as described above in connection with stage 312 of the example pipeline 300 of FIG. 3. In particular, the processing system may apply principal component analysis (PCA) to combine and reduce features to provide a set of transformed/reduced features (e.g., an "intermediate representation").

At optional step 425, the processing system may generate a compressed representation of the known object from the intermediate representation, where the compressed representation of the known object is stored in the one or more hash tables. In one example, optional step 425 may comprise the same or similar operations as described above in connection with stage 314 of the example pipeline 300 of FIG. 3. In particular, the processing system may train/build a statistical model (e.g., Gaussian mixture model (GMM)) using the feature points transformed by PCA of optional step 420, and then utilize Fisher vector (FV) encoding to further compress the reduced feature set into a compressed representation, e.g., a Fisher vector with a fixed length. In one example, the Fisher vector may be placed into one or more hash tables (e.g., an LSH table) based upon a nearest neighbor search such that the Fisher vector is grouped with other similar Fisher vectors (e.g., related to similar images/objects).

At step 430, the processing system obtains a feature set from a camera frame of a client device. In one example, the camera frame is obtained from a marker-less AR platform controlling a camera of the client device which may transmit the camera frame, or a downscaled/reduced-size version of the camera frame to the processing system. The processing system may then extract the feature set at step 430 via a SIFT process, a SURF process, a FAST process, a FREAK process, a BRISK process, or the like. In one example, step 430 may comprise the same or similar operations as described above in connection with stage 320 of the example pipeline 300 of FIG. 3. In one example, step 430 may also comprise the same or similar operations as optional step 415.

At step 435, the processing system performs a feature reduction of the feature set to produce a reduced feature set. In one example, step 435 may include performing a dimensionality reduction of the feature set via principal component analysis (PCA) to produce the reduced feature set. In one example, step 435 may comprise the same or similar operations as described above in connection with stage 322 of the example pipeline 300 of FIG. 3. In one example, step 435 may also comprise the same or similar operations as optional step 420.

At step 440, the processing system generates a compressed representation from the reduced feature set. In one example, step 440 may include generating a Gaussian mixture model from the reduced feature set, and applying a Fisher vector encoding to the Gaussian mixture model to produce the compressed representation, e.g., where the compressed representation comprises a Fisher vector. In one example, step 440 may comprise the same or similar operations as described above in connection with stage 324 of the example pipeline 300 of FIG. 3. In one example, step 440 may also comprise the same or similar operations as optional step 425.

At step 445, the processing system compares the compressed representation of the reduced feature set to a plurality of compressed representations of known objects stored in hash table to identify an object in the camera frame. In one example, step 445 may comprise the same or similar operations as described above in connection with stage 326 of the example pipeline 300 of FIG. 3. In one example, the hash table(s) comprise locality sensitive hashing table(s). In one example, the plurality of compressed representations of known objects stored in the hash table(s) comprises a plurality of Fisher vectors representing the known objects. For instance, the plurality of Fisher vectors may be generated and stored in the hash table in accordance with optional step 425.

In one example, step 445 may include identifying a plurality of nearest neighbors to the compressed representation from among the plurality of compressed representations of known objects stored in the one or more hash tables, comparing the compressed representation to each of the plurality of nearest neighbors to determine a number of shared features, and identifying the object in accordance with a nearest neighbor of the plurality of nearest neighbors having a highest number of shared features. In one example, step 445 may comprise SIFT feature matching, or the like. In one example, step 445 may be performed by at least one central processing unit of the processing system. In one example, the obtaining the feature set, the performing the feature reduction, and the generating the compressed representation of steps 430, 435, and 440 are performed via at least one graphics processing unit of the processing system. In one example, the processing system may comprise edge computing infrastructure of a telecommunication network.

At optional step 450, the processing system may detect an object boundary of the object in the camera frame. In one example, the object boundary is represented as a plurality of vertex locations in the camera frame.

At optional step 455, the processing system may detect a pixel size of the object in the camera frame.

At step 460, the processing system provides an identification of the object to the client device, e.g., an object identifier, a name, etc. In one example, the providing of the identification at step 460 may further include providing the object boundary of the object that may be detected at optional step 450. In one example, the providing of the identification at step 460 may further include providing the pixel size of the object that may be detected at optional step 455.

Following step 460, the method 400 proceeds to step 495 where the method ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 410-425 with respect to different objects to be recognized, steps 430-460 with respect to additional camera frames from a same or a different client device, etc. In another example, step 460 may be expanded to include providing annotation information for the recognized object to enable the client device to render the annotation information within/on a display of the camera view. Thus, these and other modifications are all contemplated within the scope of the present disclosure.

Figure 5:
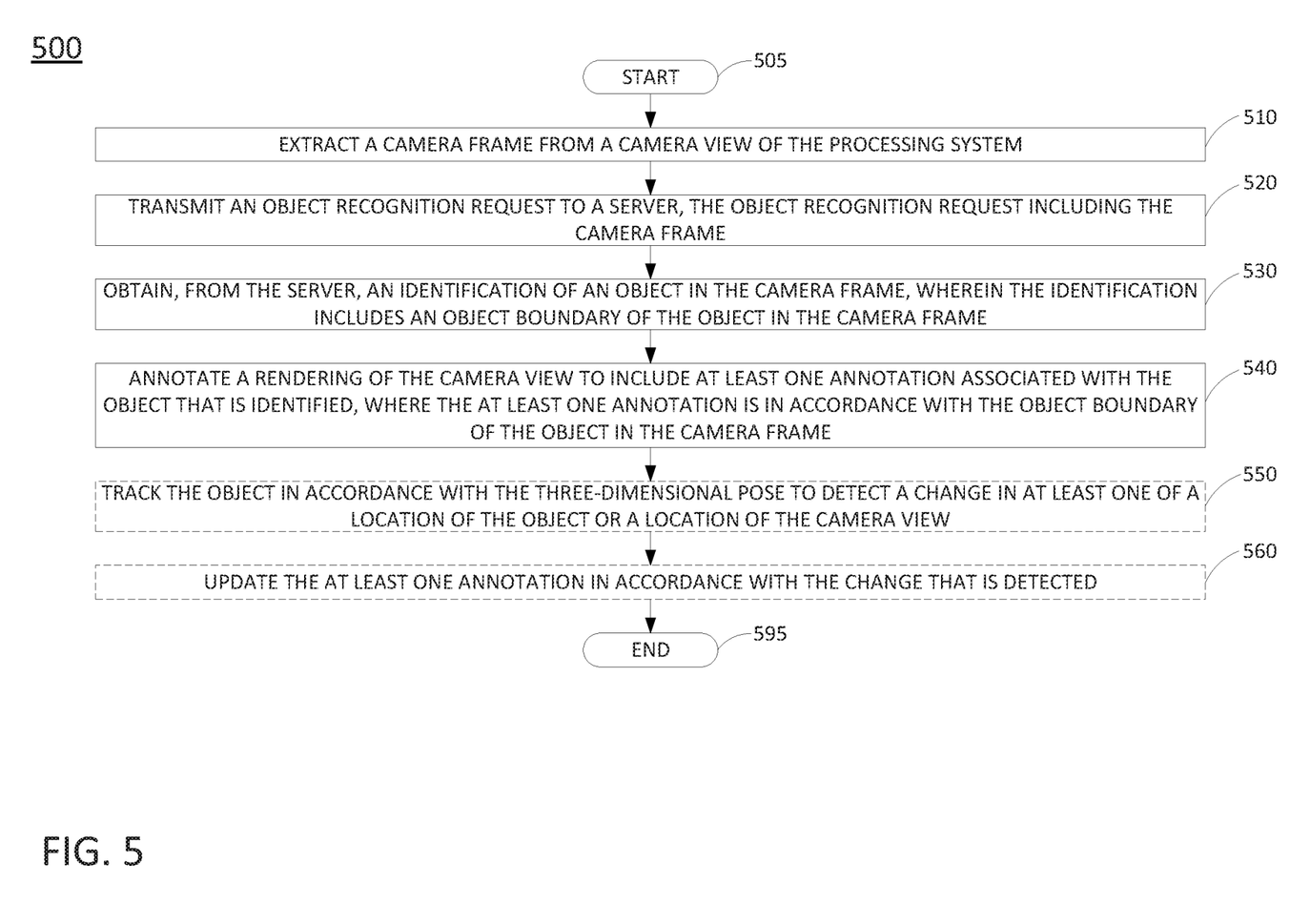
FIG. 5 illustrates a flowchart of an example method for annotating a rendering of a camera view to include at least one annotation associated with an object that is identified in a camera frame.

FIG. 5 illustrates a flowchart of an example method 500 for identifying an object in a camera frame, in accordance with the present disclosure. In one example, the method 500 is performed by a component of the system 100 of FIG. 1, such as by device 131, and/or any one or more components thereof (e.g., a processor, or processors, performing operations stored in and loaded from a memory), or by device 131, in conjunction with one or more other devices, such as application server 104, and so forth. In one example, the steps, functions, or operations of method 500 may be performed by a computing device or system 600, and/or processor 602 as described in connection with FIG. 6 below. For instance, the computing device or system 600 may represent any one or more components of device 131, application server 104, etc. in FIG. 1 that is/are configured to perform the steps, functions and/or operations of the method 500. Similarly, in one example, the steps, functions, or operations of method 500 may be performed by a processing system comprising one or more computing devices collectively configured to perform various steps, functions, and/or operations of the method 500. For instance, multiple instances of the computing device or processing system 600 may collectively function as a processing system. For illustrative purposes, the method 500 is described in greater detail below in connection with an example performed by a processing system. The method 500 begins in step 505 and proceeds to step 510.

At step 510, the processing system extracts a camera frame from a camera view of the processing system. In one example, the camera view is obtained from AR platform of the processing system (e.g., a client device). In one example, the AR platform may comprise ARCore, ARKit, or the like.

At step 520, the processing system transmits an object recognition request to a server, the object recognition request including the camera frame. It should be noted that the server may comprise one or more physical devices, such as a dedicated server, one or more host devices/NFVI of a SDN, one or more VMs deployed in a public cloud and/or edge cloud, etc. For instance, in one example, the processing system may comprise a client device and the server may comprise edge computing infrastructure of a telecommunication network. In addition, in one example, the server may include at least one graphics processing unit (GPU) to identify the object in the camera frame (e.g., in accordance with one or more steps of the example method 400 above).

At step 530, the processing system obtains, from the server, an identification of an object in the camera frame, wherein the identification includes an object boundary of the object in the camera frame.

At step 540, the processing system annotates a rendering of the camera view to include at least one annotation associated with the object that is identified, where the at least one annotation is in accordance with the object boundary of the object in the camera frame. In one example, a "rendering of the camera view" can be semi-transparent projection via AR glasses, e.g., using projector(s) and mirror(s), where the "camera view" is the same as the outward view of the user via the AR glasses. In another example, rendering could be the display of a smartphone presenting the camera frames from the camera view of the camera, including the additional annotation(s), and so on.

In one example, step 540 may include transforming the object boundary into a three-dimensional pose, where the at least one annotation is overlaid on the camera view in accordance with the three-dimensional pose. For instance, the pose represents a transformation from the object's space to a world space, and may include a rotation and translation from a reference point/frame of reference of the world space. It should be noted that a world space may comprise a coordinate space in accordance with a marker-less AR platform (e.g., ARCore). In one example, the object boundary is represented as a plurality of two-dimensional vertex locations in the camera frame. In such an example, the transforming may generate the plurality of three-dimensional vertex coordinates in a world space in accordance with: a view matrix describing a placement of a camera rendering the camera view, a projection matrix describing a three-dimensional to two-dimensional transformation, and the plurality of two-dimensional vertex locations. For instance, the transforming may be in accordance with Equation 1 above. In one example, step 540 may include calculating a pose of the recognized object in the camera frame (e.g., translating a 2D boundary from the server into a 3D pose in 6 degrees of freedom (6 DoF)). In addition, the at least one annotation may be associated with at least one anchor in a world space. For instance the at least one "anchor" may be "anchored" (e.g., having a position with a fixed spatial relationship) to trackable features of the object in a 3D pose.

In one example, step 540 may also include determining a size of the object in accordance with the object boundary of the object, where the at least one annotation is rendered at a scale in accordance with the size of the object. For instance, based on vertices defining the boundary/outline of the object and information on the object size (e.g., in pixels) from the server, the processing system may derive the physical size and a model matrix of the object.

At optional step 550, the processing system may track the object in accordance with the three-dimensional pose to detect a change in at least one of a location of the object or a location of the camera view.

At optional step 560, the processing system may update the at least one annotation in accordance with the change that is detected.

Following step 540 or optional step 560 the method 500 proceeds to step 595 where the method ends.

It should be noted that the method 500 may be expanded to include additional steps, or may be modified to replace steps with different steps, to combine steps, to omit steps, to perform steps in a different order, and so forth. For instance, in one example the processing system may repeat one or more steps of the method 500, such as steps 510-540 with respect to different objects to be recognized, optional steps 550-560 with respect to additional camera frames, etc. Thus, these and other modifications are all contemplated within the scope of the present disclosure.

In addition, although not expressly specified above, one or more steps of the method 400 or the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 or FIG. 5 that recite a determining operation or involve a decision do not necessarily require that both branches of the determining operation be practiced. In other words, one of the branches of the determining operation can be deemed as an optional step. Thus, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

It should also be noted that although the terms, "first," "second," "third," etc., may be used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

FIG. 6 depicts a high-level block diagram of a computing device or processing system specifically programmed to perform the functions described herein. For example, any one or more components or devices illustrated in FIG. 1 or described in connection with the method 400 or the method 500 may be implemented as the processing system 600. As depicted in FIG. 6, the processing system 600 comprises one or more hardware processor elements 602 (e.g., a microprocessor, a central processing unit (CPU) and the like), a memory 604, (e.g., random access memory (RAM), read only memory (ROM), a disk drive, an optical drive, a magnetic drive, and/or a Universal Serial Bus (USB) drive), a module 605 for identifying an object in a camera frame and/or for annotating a rendering of a camera view, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for identifying an object in a camera frame and/or for annotating a rendering of a camera view (e.g., a software program comprising computer-executable instructions) can be loaded into memory 604 and executed by hardware processor element 602 to implement the steps, functions or operations as discussed above in connection with the example method 400 or 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for identifying an object in a camera frame and/or for annotating a rendering of a camera view (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a feature set from a camera frame of a client device;
performing, by the processing system, a feature reduction of the feature set to produce a reduced feature set;
generating, by the processing system, a compressed representation from the reduced feature set;
comparing, by the processing system, the compressed representation of the reduced feature set to a plurality of compressed representations of known objects stored in one or more hash tables to identify an object in the camera frame, wherein the one or more hash tables comprise one or more locality sensitive hashing tables, and, wherein the comparing comprises:
identifying, by the processing system, a plurality of nearest neighbors to the compressed representation from among the plurality of compressed representations of known objects stored in the one or more hash tables;
comparing, by the processing system, the compressed representation to each of the plurality of nearest neighbors to determine a number of shared features; and
identifying, by the processing system, the object in accordance with a nearest neighbor of the plurality of nearest neighbors having a highest number of the shared features; and
providing, by the processing system, an identification of the object to the client device.

2. The method of claim 1, wherein the performing the feature reduction comprises:
performing a dimensionality reduction of the feature set via principal component analysis to produce the reduced feature set.

3. The method of claim 1, wherein the generating the compressed representation from the reduced feature set comprises:
generating a gaussian mixture model from the reduced feature set; and
applying a fisher vector encoding to the gaussian mixture model to produce the compressed representation, wherein the compressed representation comprises a fisher vector.

4. The method of claim 3, wherein the plurality of compressed representations of known objects stored in the one or more hash tables comprises a plurality of fisher vectors representing the known objects.

5. The method of claim 1, wherein the obtaining the feature set from the camera frame comprises:
a scale invariant feature transform process;
a speeded up robust features process;
a features from accelerated segment test process;
a fast retina keypoint process; or
a binary robust invariant scalable keypoints process.

6. The method of claim 1, further comprising:
detecting an object boundary of the object in the camera frame, wherein the providing the identification of the object to the client device further includes the object boundary of the object.

7. The method of claim 6, wherein the object boundary is represented as a plurality of vertex locations in the camera frame.

8. The method of claim 1, further comprising:
detecting a pixel size of the object in the camera frame, wherein the providing the identification of the object to the client device further includes the pixel size of the object.

9. The method of claim 1, further comprising, for each of the known objects:
obtaining a feature set from the known object;
performing a feature reduction on the feature set of the known object to produce an intermediate representation; and
generating a compressed representation of the known object from the intermediate representation, wherein the compressed representation of the known object is stored in the one or more hash tables.

10. The method of claim 1, wherein the obtaining the feature set, the performing the feature reduction, and the generating the compressed representation, are performed via at least one graphics processing unit of the processing system.

11. The method of claim 1, wherein the processing system comprises an edge computing infrastructure of a telecommunication network.

12. The method of claim 1, wherein the camera frame is obtained from a marker-less augmented reality platform controlling a camera of the client device.

13. A non-transitory computer-readable medium storing instructions which, when executed by a processing system including at least one processor, cause the processing system to perform operations, the operations comprising:
obtaining a feature set from a camera frame of a client device;
performing a feature reduction of the feature set to produce a reduced feature set;
generating a compressed representation from the reduced feature set;
comparing the compressed representation of the reduced feature set to a plurality of compressed representations of known objects stored in one or more hash tables to identify an object in the camera frame, wherein the one or more hash tables comprise one or more locality sensitive hashing tables, and, wherein the comparing comprises:
identifying a plurality of nearest neighbors to the compressed representation from among the plurality of compressed representations of known objects stored in the one or more hash tables;
comparing the compressed representation to each of the plurality of nearest neighbors to determine a number of shared features; and
identifying the object in accordance with a nearest neighbor of the plurality of nearest neighbors having a highest number of the shared features; and
providing an identification of the object to the client device.

14. The non-transitory computer-readable medium of claim 13, wherein the performing the feature reduction comprises:
performing a dimensionality reduction of the feature set via principal component analysis to produce the reduced feature set.

15. The non-transitory computer-readable medium of claim 13, wherein the generating the compressed representation from the reduced feature set comprises:
generating a gaussian mixture model from the reduced feature set; and applying a fisher vector encoding to the gaussian mixture model to produce the compressed representation, wherein the compressed representation comprises a fisher vector.

16. The non-transitory computer-readable medium of claim 15, wherein the plurality of compressed representations of known objects stored in the one or more hash tables comprises a plurality of fisher vectors representing the known objects.

17. The non-transitory computer-readable medium of claim 13, wherein the obtaining the feature set from the camera frame comprises:
   a scale invariant feature transform process;
   a speeded up robust features process;
   a features from accelerated segment test process;
   a fast retina keypoint process; or
   a binary robust invariant scalable keypoints process.

18. The non-transitory computer-readable medium of claim 13, the operations further comprising:
   detecting an object boundary of the object in the camera frame, wherein the providing the identification of the object to the client device further includes the object boundary of the object.

19. The non-transitory computer-readable medium of claim 18, wherein the object boundary is represented as a plurality of vertex locations in the camera frame.

20. The non-transitory computer-readable medium of claim 13, the operations further comprising:
   detecting a pixel size of the object in the camera frame, wherein the providing the identification of the object to the client device further includes the pixel size of the object.

* * * * *